Figure 1:
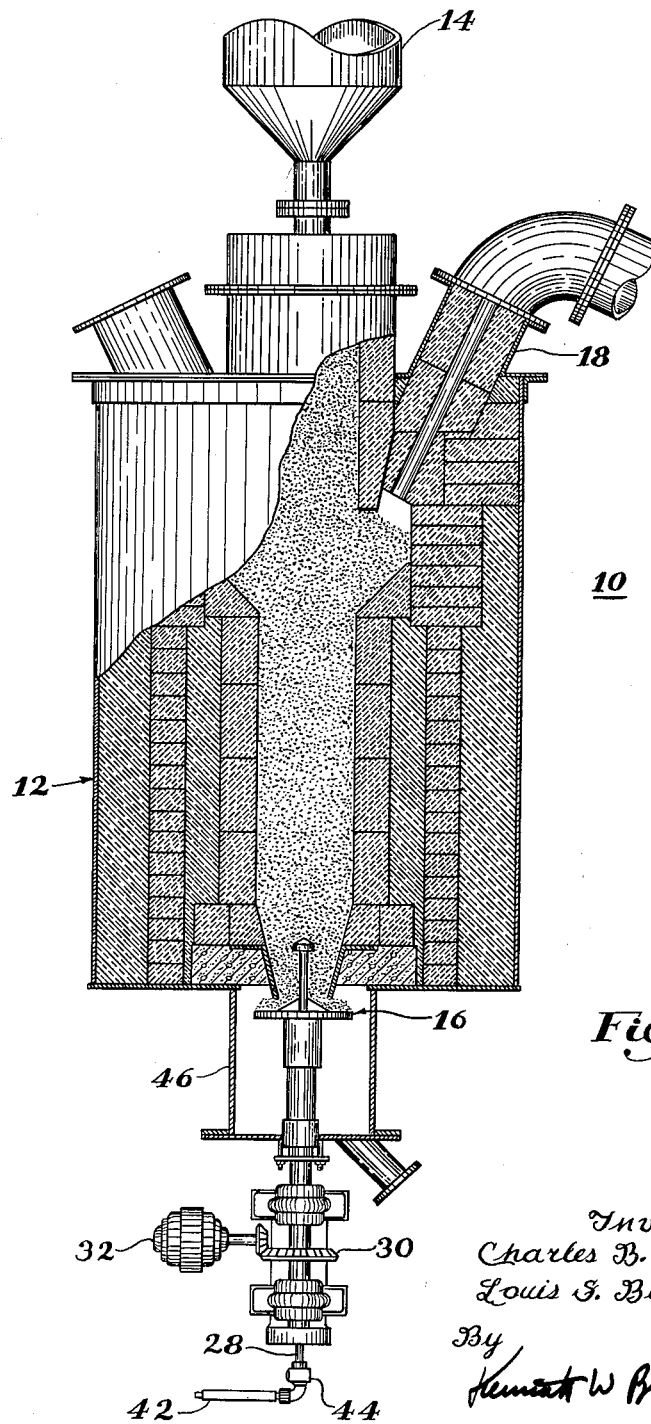

April 3, 1962 C. B. WENDELL, JR., ETAL 3,028,226
APPARATUS FOR PROVIDING UNIFORM DESCENT OF A PARTICULATE
SOLID MATERIAL DISPOSED IN A REACTION CHAMBER
Filed July 17, 1957 3 Sheets-Sheet 3

Inventors
Charles B. Wendell Jr.
Louis S. Belknap
By Kenneth W Brown Atty

United States Patent Office 3,028,226
Patented Apr. 3, 1962

3,028,226
APPARATUS FOR PROVIDING UNIFORM DESCENT OF A PARTICULATE SOLID MATERIAL DISPOSED IN A REACTION CHAMBER
Charles B. Wendell, Jr., Canton, and Louis S. Belknap, East Bridgewater, Mass., assignors to Cabot Corporation, Boston, Mass., a corporation of Delaware
Filed July 17, 1957, Ser. No. 672,447
5 Claims. (Cl. 23—284)

This invention relates to apparatus for intermittently or continuously discharging particulate solid material from a container substantially uniformly throughout the cross-sectional area thereof. The apparatus of this invention is particularly useful for the carrying out of chemical reactions between particulate solids and gases.

In many chemical manufacturing processes it is necessary to react a gas with a solid, and this is often accomplished by passing the gas through a bed of the solid in finly divided form. For example, in the manufacture of silicon tetrachloride, chlorine gas is passed upwardly through a column of particulate material such as silicon carbide or a mixture of silica and carbon. In this process, it is convenient to feed the particulate material into the top of a vertical elongated reaction chamber, and introduce the chlorine into the chamber at a lower portion to travel upwardly through the bed of material. The desired product, silicon tetrachloride, passes out of the top of the bed as a gas. If the process is to be continuous, additional bed material must be added periodically to the top of the reaction chamber and the spent bed material must be removed from the bottom of the reaction chamber.

A major problem encountered in processes of this type is that of obtaining uniform descent of the bed. It has been found that for various reasons the center of the bed has a tendency to descend faster than the peripheral portion, and in some cases the peripheral portion does not descend at all, but hangs in place adjacent the wall of the reactor. Such non-uniform descent not only reduces the effective capacity of the reactor but also frequently results in channeling, a phenomenon in which relatively large gas passages form in the bed, permitting a major portion of the injected gas to pass upwardly through the bed without reacting therewith. The more slowly descending or stationary portions of the bed are particularly susceptible to channeling.

Another problem in the operation of such processes is accomplishing the discharge of the spent bed without permitting the escape of the reaction gases, if the reactor is operating above atmospheric pressure, or admitting excessive amounts of external gases if the reactor is operating below atmospheric pressure. This problem is particularly troublesome in processes in which the spent bed is not removed at a uniform rate, but is removed intermittently, or at varying rates.

The principal object of this invention is to provide improved apparatus for intermittently or continuously discharging particulate material from a container.

Another object of this invention is to provide a discharge valve which is adapted for discharging particulate material from the bottom of an elongated upright reaction chamber in such a manner that the descent of the bed of particulate material in the reaction chamber is substantially uniform over the entire cross-section thereof.

A further object of the invention is to provide a process for the reaction of a gas with a particulate material which is more efficient and more easily controlled than processes known heretofore.

A further object of the invention is to provide a discharge valve for the above described purpose in which gas leakage through the valve is substantially constant whether or not the valve is actually discharging solid particles.

Other objects of the invention will be obvious to one skilled in the art from the following description and accompanying drawing illustrating a specific embodiment thereof.

Figure 2:
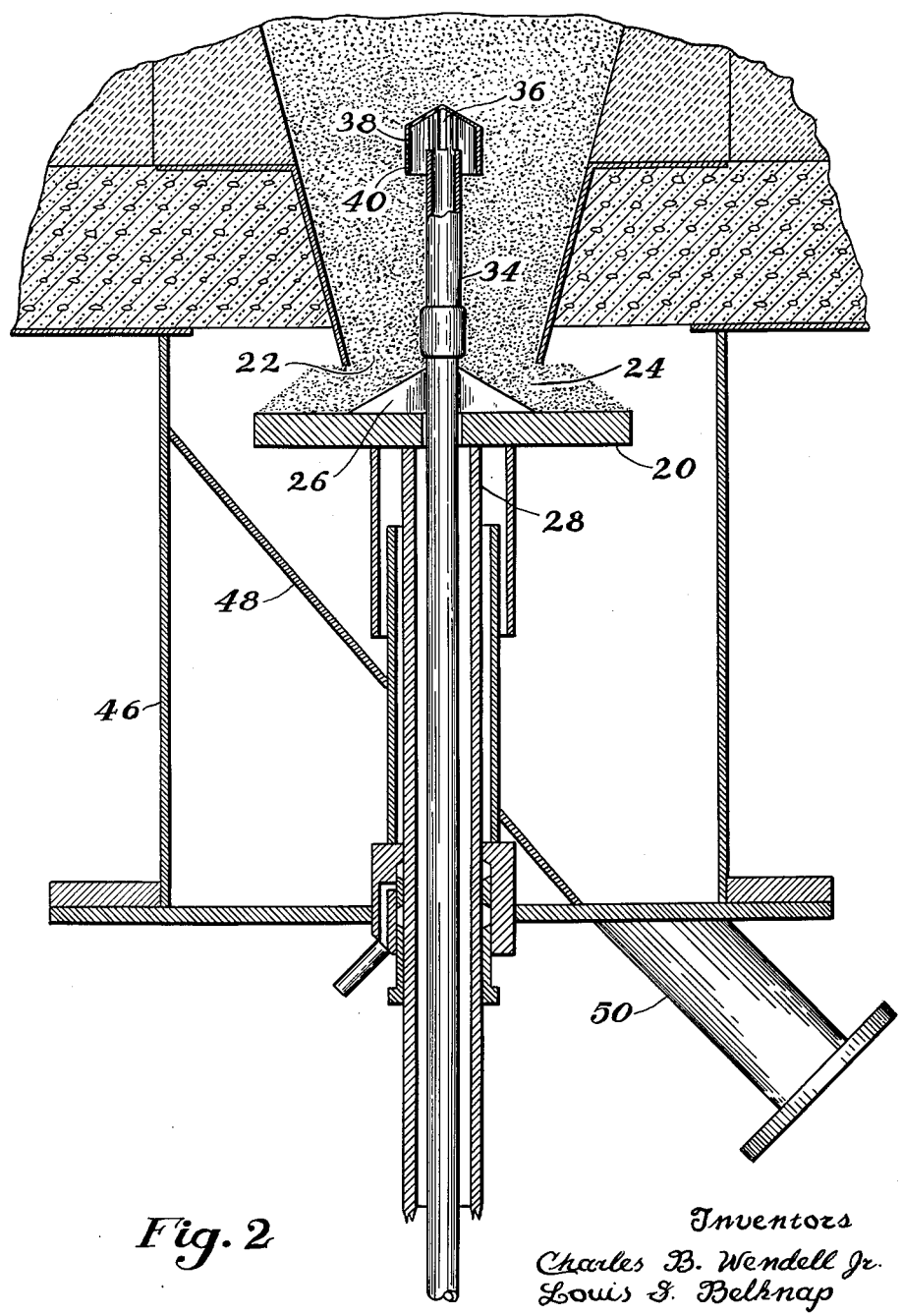
Figure 3:
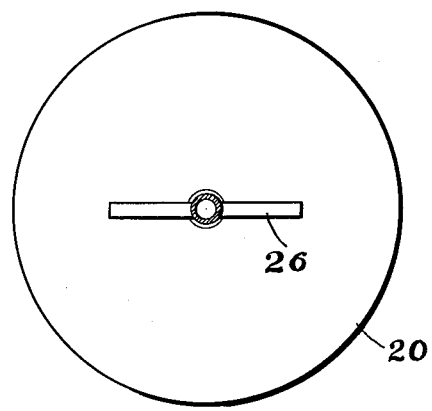
Figure 4:
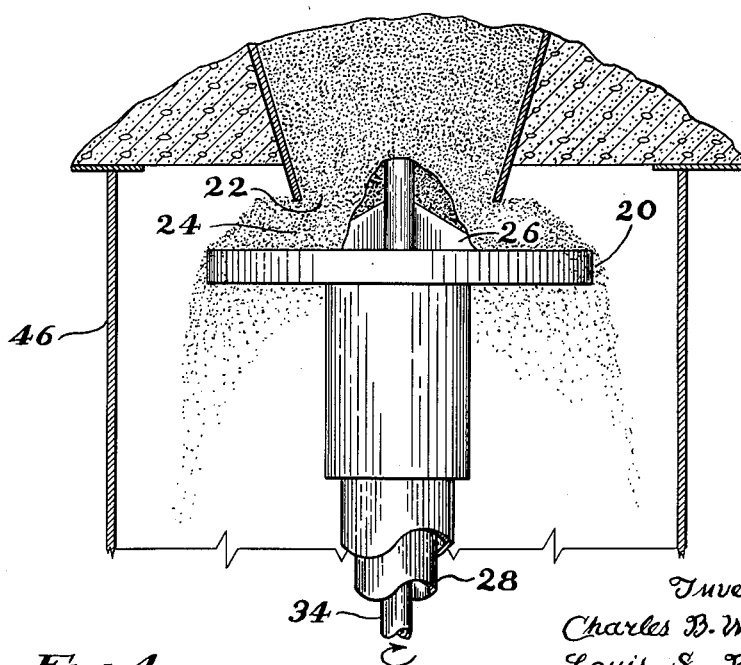

In the drawing:
FIG. 1 is a view in side elevation, partly in section, of a reactor embodying the features of the invention.
FIG. 2 is an enlarged view in side elevation, partly in section, of the discharge valve portion of the reactor of FIG. 1.
FIG. 3 is a top view partly in section of the discharge valve of FIG. 2.
FIG. 4 is a view similar to FIG. 2 in which the discharge valve is rotating to discharge material from the reactor.

Referring to the drawing, there is illustrated apparatus 10 for effecting a chemical reaction between a gas and a solid in the form of particulate material. In the illustrated embodiment, the apparatus is particularly adapted for the production of silicon tetrachloride, and comprises generally an upright elongated cylindrical reaction chamber 12 suitably lined with refractory material, a feed hopper 14 disposed above the reaction chamber 12 for feeding the bed material into the top of the reaction chamber, and a discharge valve 16 disposed at the bottom of the reaction chamber for extracting the spent material. A conduit 18 is provided leading from the upper end of the reactor to carry off the gaseous products of the reaction for collection or recycling.

The discharge valve 16 comprises generally a circular plate 20 positioned below the discharge mouth 22 of the reaction chamber in predetermined spaced relation thereto to form a peripheral discharge gap 24. A transverse vane 26 bisects the plate substantially at right angles and extends upwardly therefrom, increasing in height from opposite outer portions of the plate to the medial portion so as to project into the portion of the bed at the discharge mouth of the reactor.

The plate 20 is supported by a hollow shaft 28 which extends downwardly through suitable bearings, and is connected by a ring gear 30 to a motor 32 for rotating the shaft and the plate at any desired speed. In the illustrated embodiment the ring gear is adjustable vertically on the shaft, thereby permitting vertical adjustment of the shaft and plate 30 so as to vary the width of the discharge gap 24.

To inject the reaction gas into the reaction chamber a gas conduit 34 is provided inside the hollow shaft 28, which projects through the plate upwardly into the reaction chamber. The upper end of the conduit is provided with lateral apertures 36 and a shield cap 38 is disposed over said end, which has a depending wall 40 disposed about the conduit forming a gas passage therebetween. The reaction gas may be supplied to the lower end of the conduit in any convenient manner, preferably by a flexible hose 42 joined to the conduit by means of a rotatable coupling 44, since for convenience of construction and for other reasons to appear hereinafter it is desirable that the gas conduit and its associated cap rotate with the shaft 28 and the plate 20.

To prevent the escape to the surrounding atmosphere of the reaction gases, the discharge valve may be enclosed in a housing 46. An inclined baffle 48 leading to a discharge chute 50 may be provided in the housing 46 to assist in discharging the spent bed material from the housing.

In one method of operation of the reactor, the bed consists of silicon carbide, preferably the impure form known as firesand, crushed to a particle size of about ½ inch. Although the reaction between silicon tetrachloride and chlorine is strongly exothermic, the reactants must be heated to a temperature of about 2000° C. to initiate the reaction, after which it is self-sustaining. Hence, to start the reaction, it is necessary to heat the bed by external means, such as by electrodes or injected hot gases, and thereafter the flow of chlorine may be started to maintain the reaction. In the preferred embodiment, the reaction gas is a mixture of chlorine and silicon tetrachloride, which flows through the conduit 34 and out from under the shield cap 40 to pass upwardly through the bed for reaction therewith. The products of the reaction, silicon tetrachloride, and other gaseous reaction products pass upwardly through the bed and are extracted through conduit 18.

The bed of material in the reactor rests on plate 20, which is a predetermined distance spaced from the bottom of the reactor so that the discharge gap 24 is of a predetermined desired size. The width of the gap 24, the diameter of the plate 20, and the angle of repose of the spent bed material are so related that during operation of the reactor, when the plate 20 is not rotating, the periphery of the bed material on the plate is substantially at the edge of the plate. In other words, the distance between the bottom of the reactor and the plate is such in relation to diameter of the plate that the periphery of the plate falls just outside the cone of repose of the material on the plate. Hence as long as the plate is stationary, none of the spent bed material is discharged from the reactor. However, when the plate is rotated, the stirring imparted to the portion of the bed at the discharge mouth of the reactor by the vane 26 causes the bed material to fall over the edge of the plate. Discharge of the bed in this manner continues as long as the plate rotates, and the rate of discharge of spent bed material, and hence the rate of descent of the bed can be controlled by the rate of rotation of the plate.

It is evident that if the pressure in the reactor at the bottom of the bed is different from the pressure outside of the valve, some gas leakage will occur through the portion of the bed which is disposed in the discharge gap. However, it has been found that the amount of such leakage is substantially independent of the rate of discharge of the bed material, and in fact is substantially the same whether the valve is rotating or not. Hence, once the rate of gas leakage through the discharge gap has been determined, it can be taken into consideration in establishing the operating conditions of the reactor, and variations in the rate of discharge of the valve during operation of the reactor will not appreciably affect the composition of the reaction gas.

The discharge valve disclosed herein has also been found to provide a uniform descent of the bed over the entire cross-section of the reactor, eliminating any tendency of the bed to hang up on the walls of the reactor. Hence, the capacity of the reactor is maintained at a maximum and the possibility of channeling is greatly reduced. The reasons for this result are not entirely clear, however, it is suspected that it may be due to the circumferential stirring imparted to the lower portion of the bed by the vane 26, and perhaps in part to the presence of the center conduit and shield cap extending up into the bed, which tends to add resistance to downward movement of the bed in the center thereof, compensating for the peripheral resistance resulting from wall friction.

The discharge valve disclosed herein provides an economical and easily controllable means for effecting the uniform discharge of particulate material from a reactor without variations of gas flow through the valve, and although the illustrated embodiment of the invention has been described in connection with a particular process for the manufacture of silicon tetrachloride, it will be understood that it is adapted for any similar process in which it is desired to react or treat a solid particulate material with a gas.

Since certain obvious changes may be made in the device without departing from the scope of the invention, it is intended that all matter contained herein be interpreted in an illustrative and not a limiting sense.

We claim:
1. Apparatus for discharging particulate solid material from a reaction chamber substantially uniformly throughout the cross-sectional area thereof comprising a vertical elongated reaction chamber for holding a bed of said particulate material, said chamber having a bottom opening, and a discharge valve disposed below said opening, said valve comprising a flat plate member larger in diameter than the bottom opening and adjustable therefrom to form a peripheral discharge gap, said flat plate having a straight transverse vane rigidly attached thereto and projecting upwardly therefrom at a right angle thereto, the length of said vane being at least equal to the diameter of the said bottom opening and tapering upwards from both ends thereof to a point of maximum height at about the medial portion of the said flat plate, and means for rotating said plate member.

2. Apparatus as set forth in claim 1 in which said flat plate member is adjustable to a point at which the periphery of said flat plate is disposed just beyond the cone of repose of the particulate material to be discharged.

3. Apparatus for reacting a particulate solid material with a gas and for discharging the particulate solid material from a chamber substantially uniformly throughout the cross-sectional area thereof comprising a vertical elongated reaction chamber for containing a bed of said particulate material, said chamber having means at the upper end for feeding particulate material into the reactor, and a discharge opening at the lower end, a discharge valve disposed below said discharge opening, said valve comprising a flat plate bed-support member larger than the discharge opening and adjustable therefrom to form a peripheral discharge gap, said flat plate member being rotatable and having a straight transverse vane rigidly attached thereto and projecting upwardly therefrom at a right angle thereto, the length of said vane being at least equal to the diameter of the said bottom opening and tapering upwardly from both ends thereof to a point of maximum height at about the medial portion of said plate so as to cause circumferential stirring of the bed material adjacent the discharge opening when said flat plate member is rotated, thereby effecting a uniform descent of the material in said reaction chamber and a uniform discharge of the material through the discharge gap, means for rotating said flat plate member, means for injecting a gas into the lower portion of the bed above the said discharge valve, and means above the bed for removing gaseous reaction products.

4. The apparatus of claim 3 in which the means for injecting said gas comprises a small tube extending through the center of said flat plate member and well up into the lower portion of said bed, the gas discharge openings in said tube for injecting said gas being located at a point well up into the lower portion of said bed.

5. The apparatus of claim 3 wherein there is provided a gas-tight enclosure surrounding the discharge valve while the means for rotating said flat plate member comprises a drive shaft extending from the bottom of said flat plate member out through a gas-tight seal in said enclosure and drive means connected to said shaft at a point located outside of said enclosure.

References Cited in the file of this patent

UNITED STATES PATENTS

| | | |
|---|---|---|
| 399,794 | Taylor | Mar. 19, 1889 |
| 1,271,713 | Hutchins | July 9, 1918 |
| 1,973,874 | Marischka | Sept. 18, 1934 |
| 1,983,687 | Wolfe | Dec. 11, 1934 |
| 2,805,919 | Ishizuka | Sept. 10, 1957 |

FOREIGN PATENTS

| | | |
|---|---|---|
| 850,449 | Germany | Sept. 25, 1952 |